United States Patent
Abbigeri et al.

(10) Patent No.: US 12,423,190 B1
(45) Date of Patent: Sep. 23, 2025

(54) SELF-SERVICE DATA PROTECTION OPERATION OF ACTIVE-PASSIVE AND ACTIVE-ACTIVE DATABASE CLUSTERS

(71) Applicant: Dell Products L.P., Round Rock, TX (US)

(72) Inventors: Shivaraj Abbigeri, Navalgund (IN); Rejith Mohan M, Thiruvananthapuram (IN); Navneet Upadhyay, Bangalore (IN); Elango Chockalingam, Bangalore (IN); Xiaolei Hu, Shanghai (CN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/925,535

(22) Filed: Oct. 24, 2024

(51) Int. Cl.
*G06F 11/14* (2006.01)

(52) U.S. Cl.
CPC ...... *G06F 11/1458* (2013.01); *G06F 2201/80* (2013.01)

(58) Field of Classification Search
CPC .......... G06F 11/1458; G06F 2201/80
See application file for complete search history.

(56) References Cited

U.S. PATENT DOCUMENTS

| | | | |
|---|---|---|---|
| 8,498,982 B1* | 7/2013 | Cope | G06F 21/16 707/694 |
| 2018/0077235 A1* | 3/2018 | Nachimuthu | G06F 3/06 |

\* cited by examiner

*Primary Examiner* — Loc Tran
(74) *Attorney, Agent, or Firm* — Chamberlain, Hrdlicka, White, Williams & Aughtry; Aly Z. Dossa

(57) ABSTRACT

A method for managing data protection operations includes obtaining, by a data protection system, a policy request for configuring a data protection policy on the database system, wherein the database system comprises at least one active computing node, in response to obtaining the policy request: making a first determination that a first computing node of the database system has been discovered via deep discovery, updating a selection of computing nodes with the first computing node, making a second determination that a second computing node of the database system has not been discovered via the deep discovery, not including the second computing node in the selection, and performing a protection configuration on the selection of computing nodes to install the data protection policy to each computing node in the selection of computing nodes, and wherein the data protection policy comprises storage location information used for backing up a database.

20 Claims, 11 Drawing Sheets

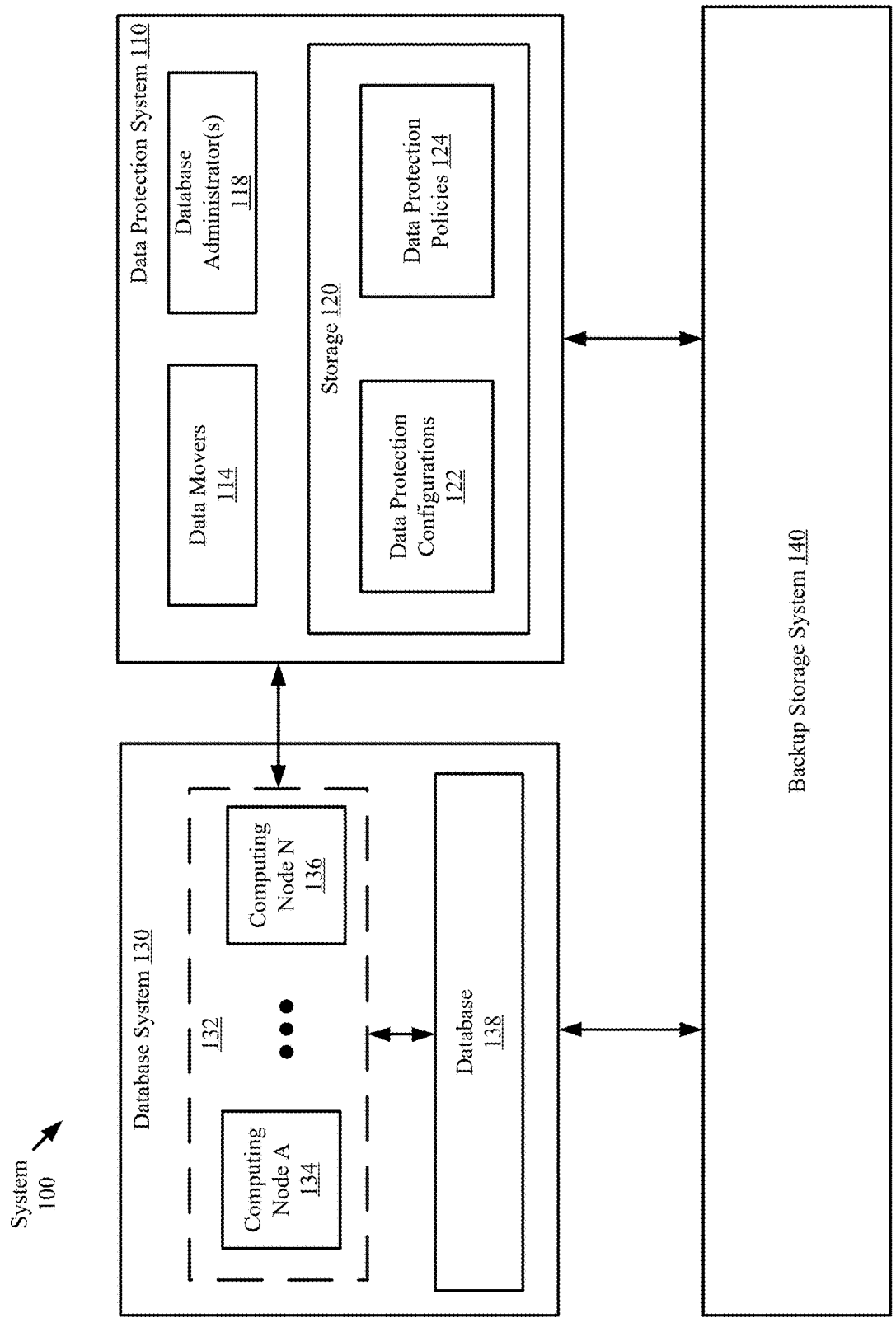
FIG. 1.1

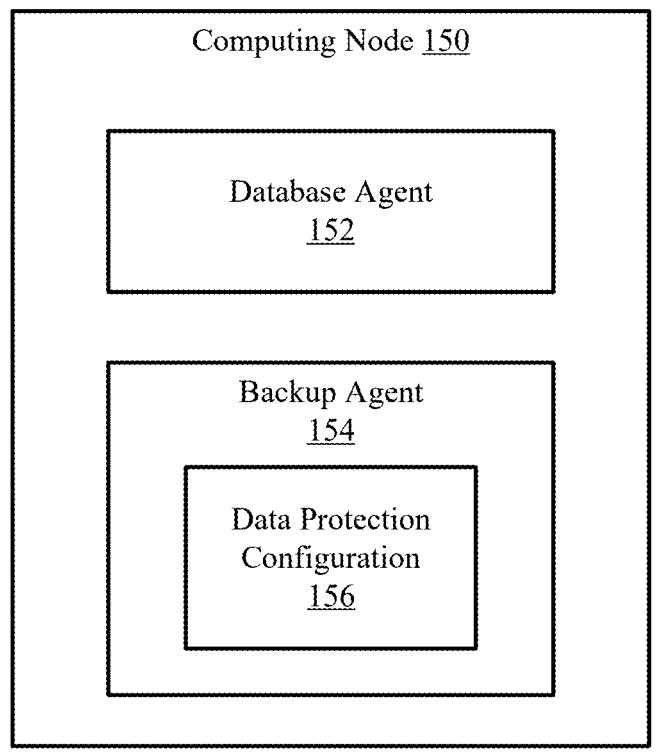
FIG. 1.2

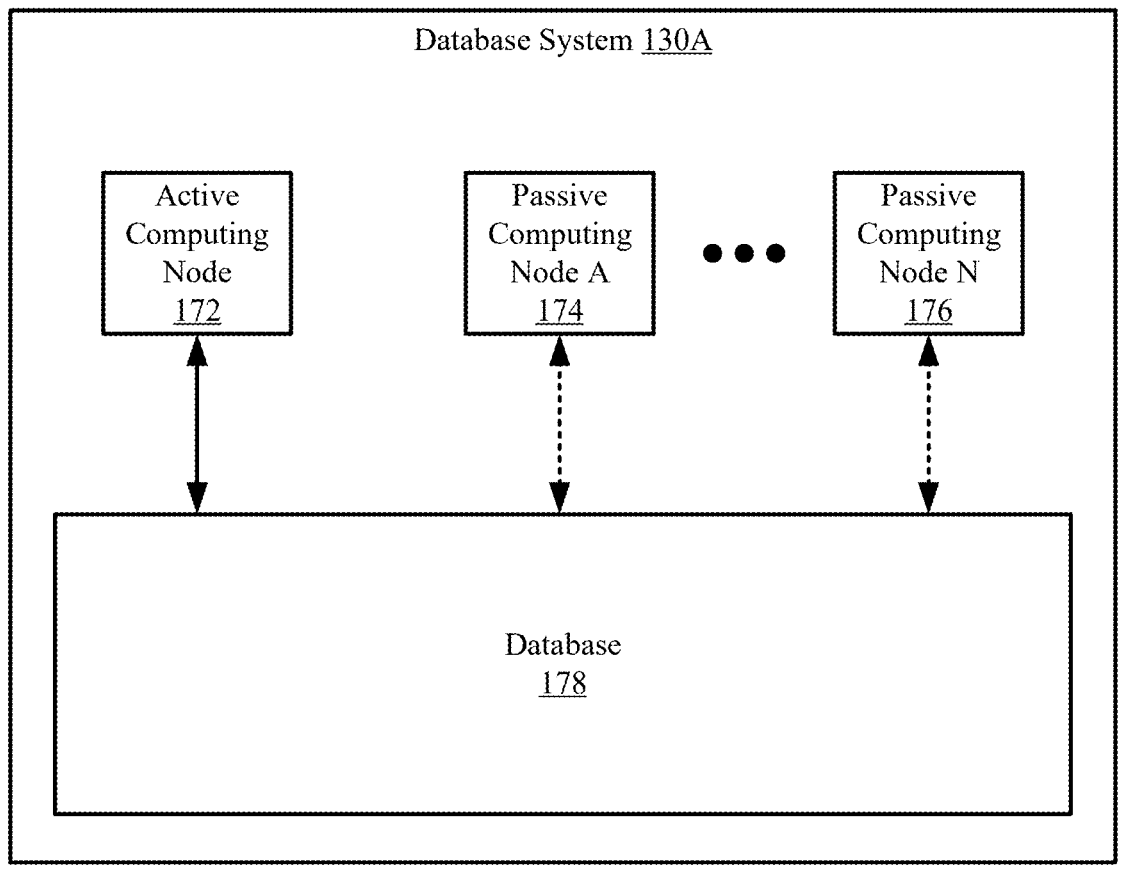
FIG. 1.3

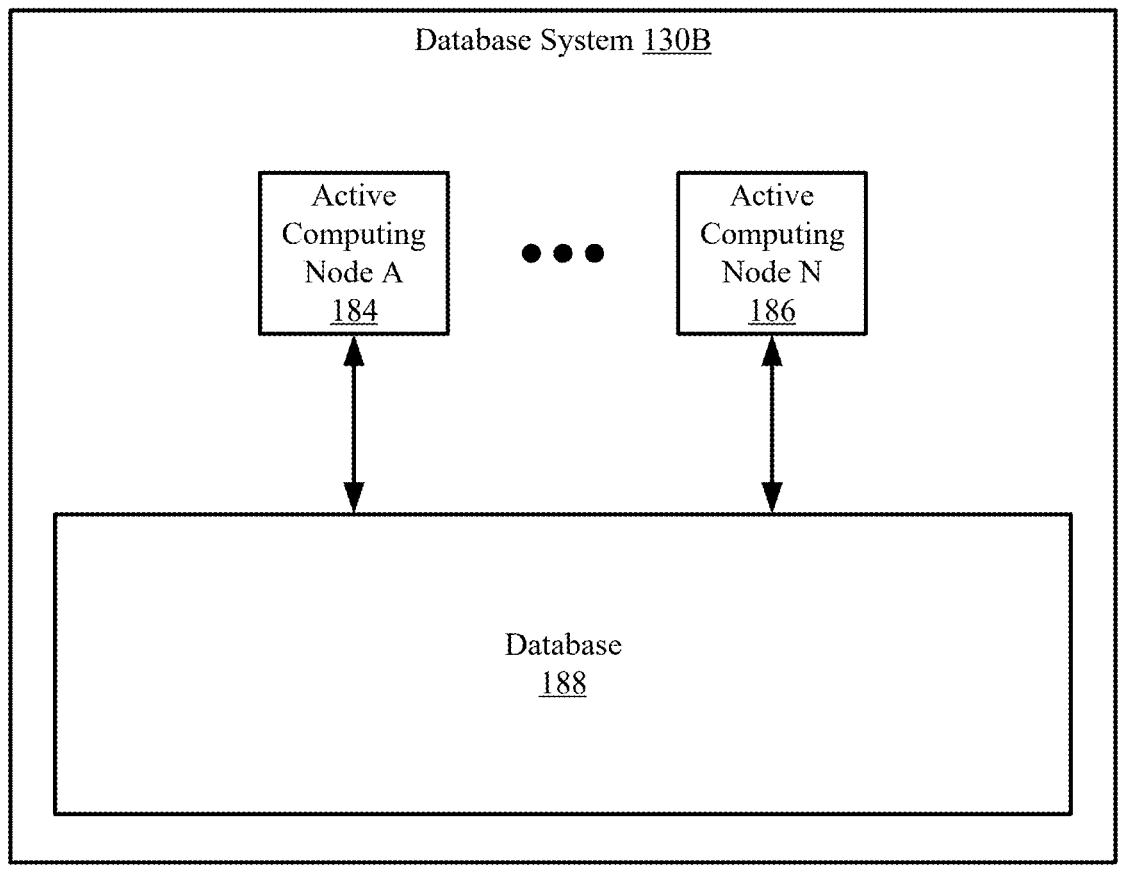
FIG. 1.4

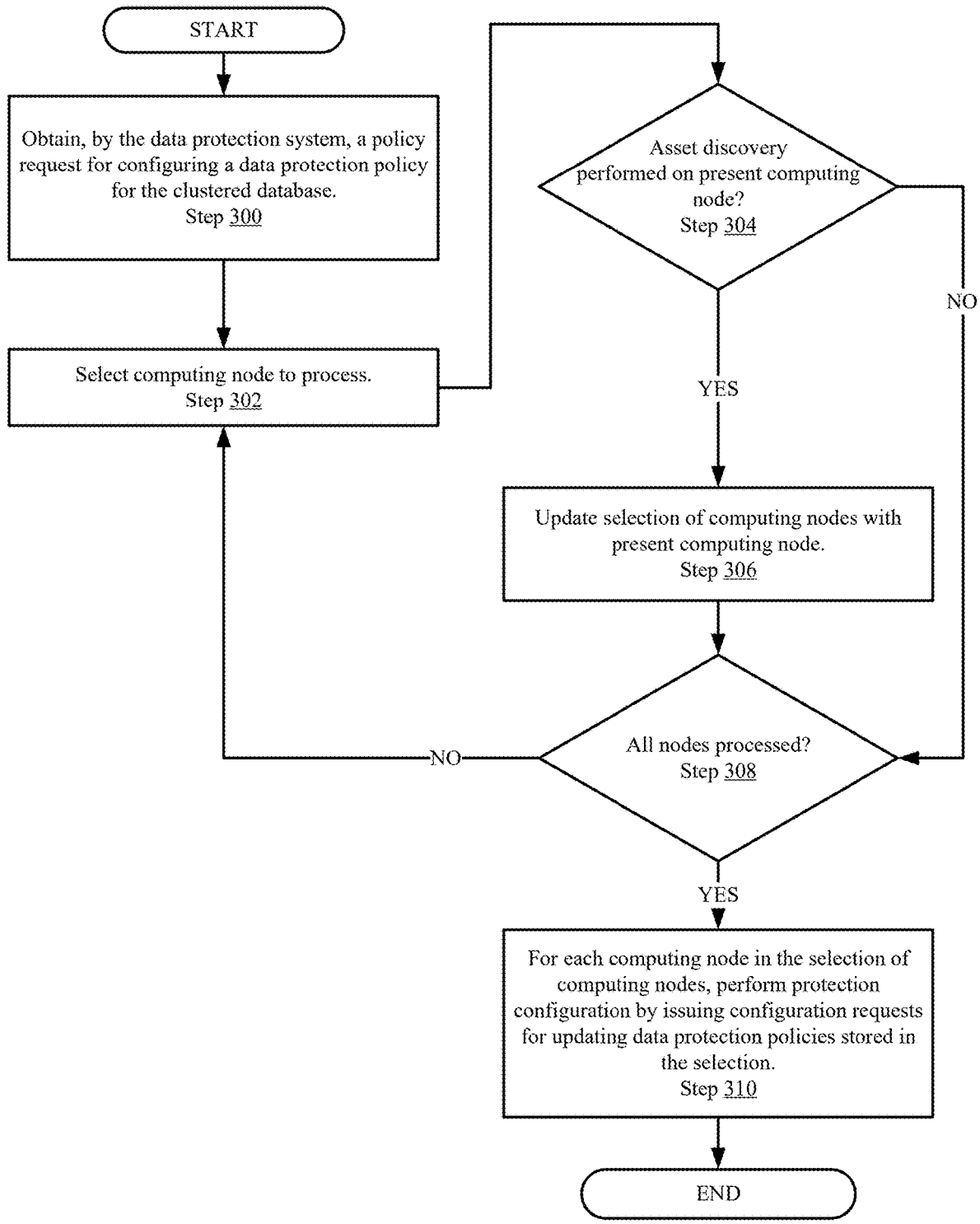
FIG. 3.1

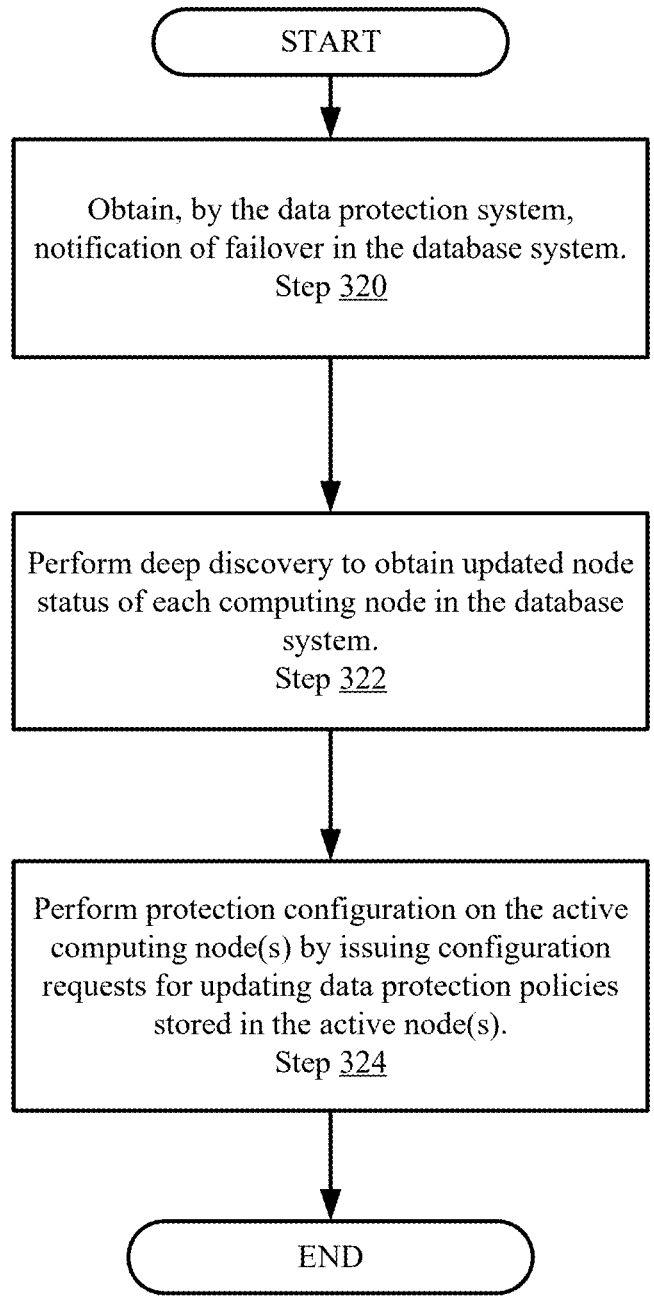
FIG. 3.2

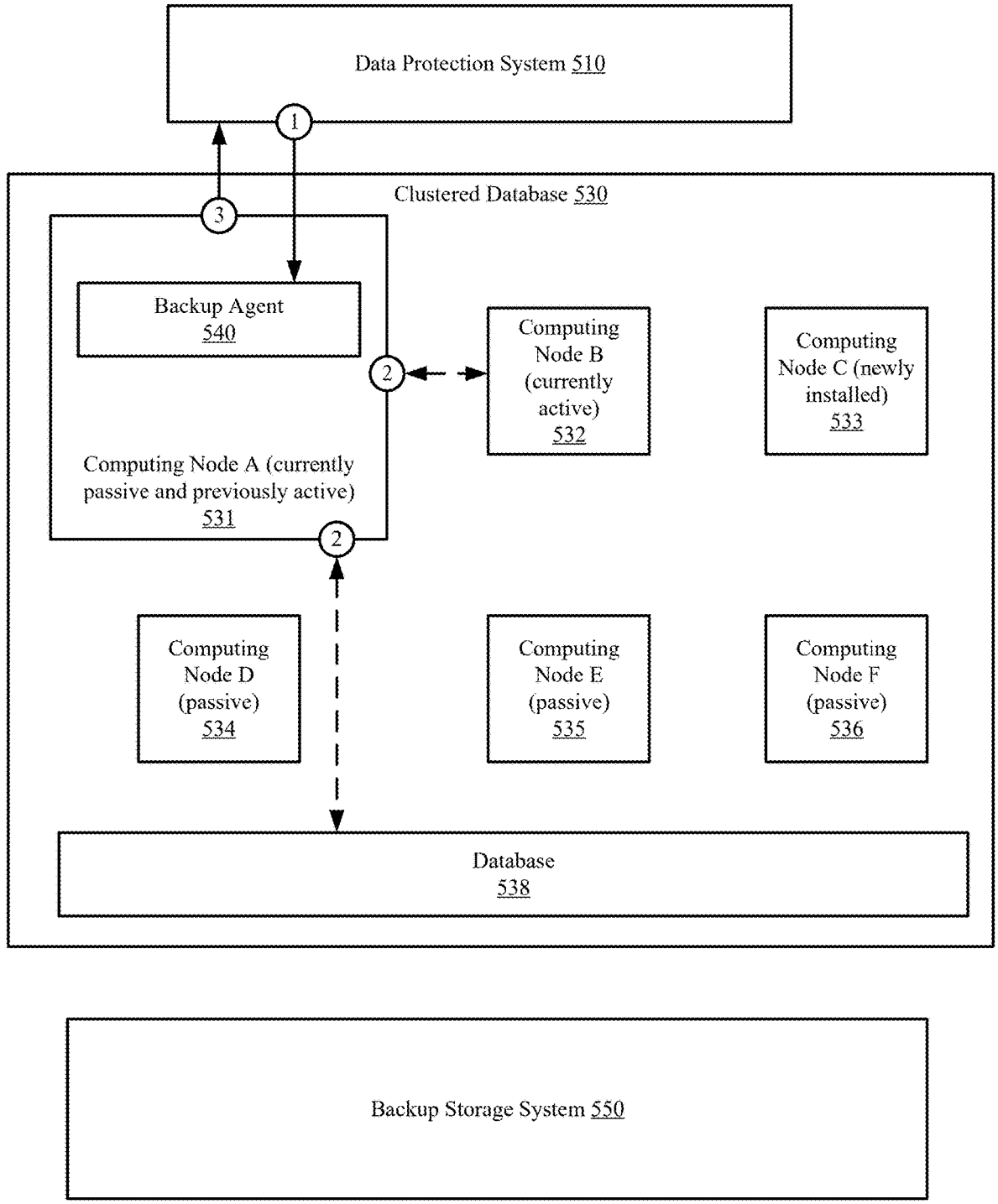
FIG. 5.1

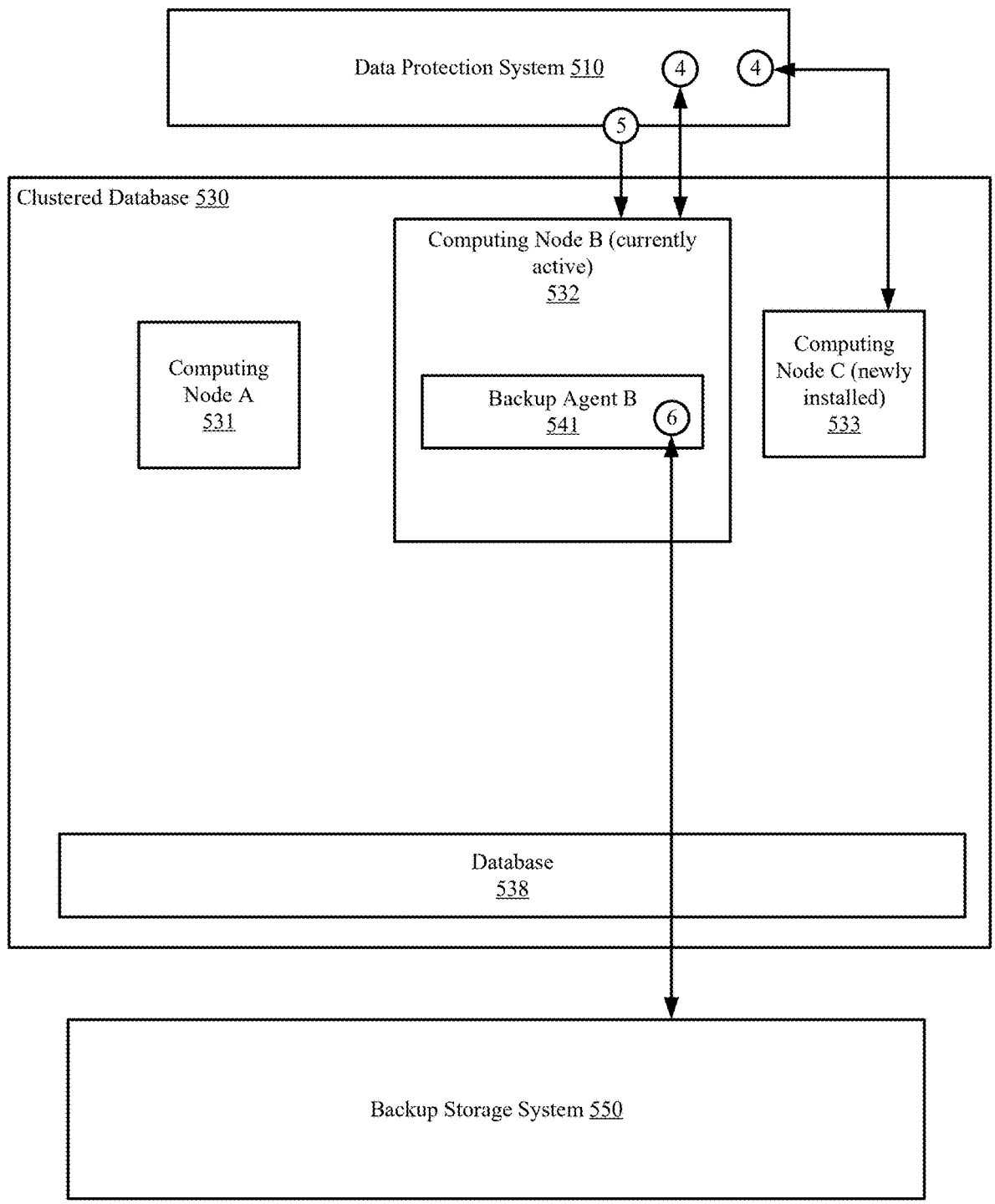
FIG. 5.2

SELF-SERVICE DATA PROTECTION OPERATION OF ACTIVE-PASSIVE AND ACTIVE-ACTIVE DATABASE CLUSTERS

BACKGROUND

Performing data protection operations on assets such as databases may require use of computing resources of one or more computing devices. The use of limited computing resources may impact other processes performed on the one or more computing devices. For example, storage and processing power used for data protection operations may limit the amount of processing of other tasks by the computing devices.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of a computing node in accordance with one or more embodiments of the invention.

FIG. 1.3 shows a diagram of an active-passive cluster in accordance with one or more embodiments of the invention.

FIG. 1.4 shows a diagram of an active-active cluster in accordance with one or more embodiments of the invention.

FIG. 3.1 shows a flowchart of a method for configuring a data protection policy on a set of computing nodes in accordance with one or more embodiments of the invention.

FIG. 3.2 shows a flowchart of a method for managing a failover in accordance with one or more embodiments of the invention.

FIGS. 5.1-5.2 show an example in accordance with one or more embodiments of the invention.

DETAILED DESCRIPTION

Figure 2:
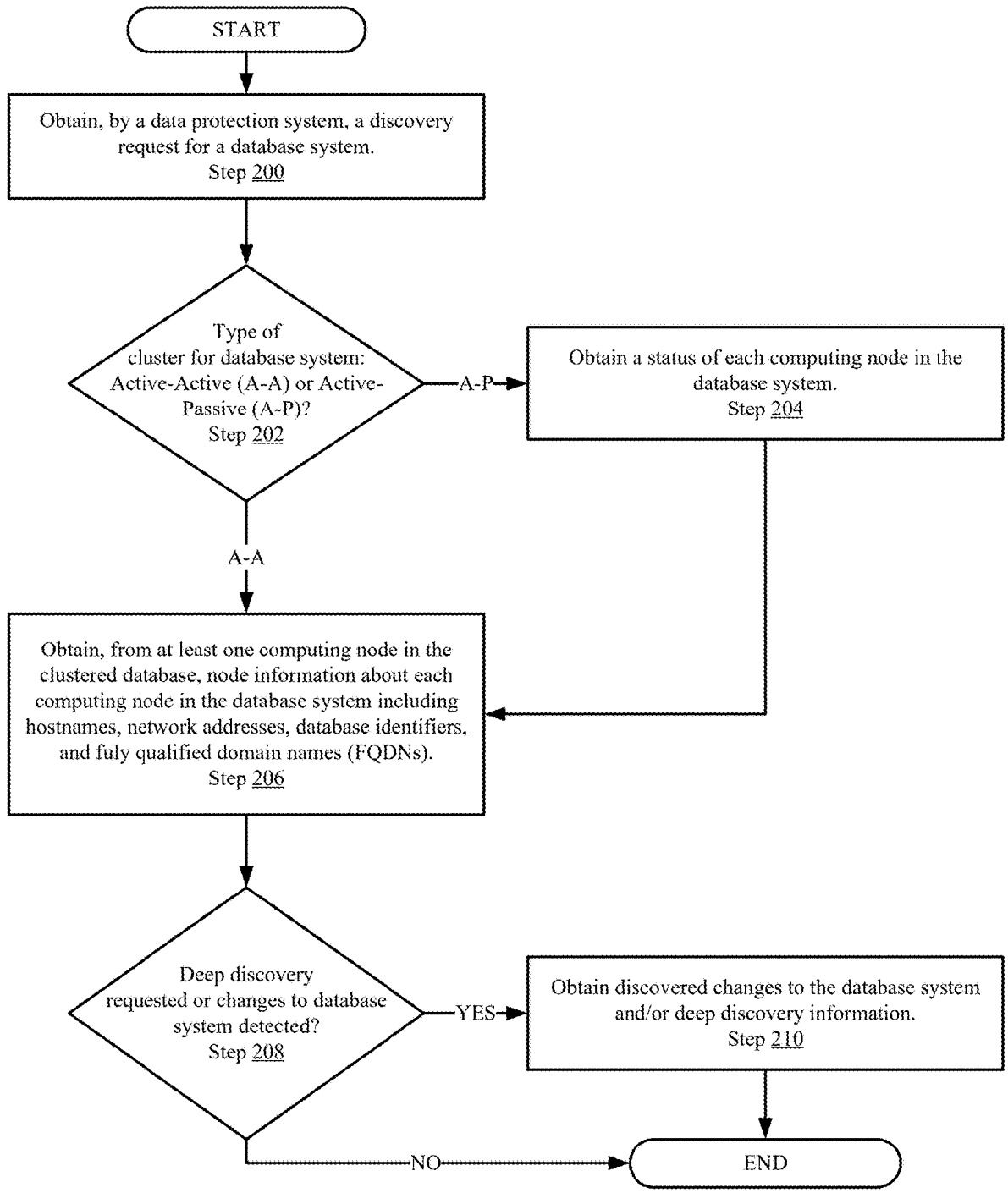
FIG. 2 shows a flowchart of a method for performing a discovery of a database system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details, and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this disclosure, elements of figures may be labeled as A to N, A to P, A to M, or A to L. As used herein, the aforementioned labeling means that the element may include any number of items, and does not require that the element include the same number of elements as any other item labeled as A to N, A to P, A to M, or A to L. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, operably connected, or operative connection, means that there exists between elements, components, and/or devices a direct or indirect connection that allows the elements to interact with one another in some way. For example, the phrase 'operably connected' may refer to any direct (e.g., wired directly between two devices or components) or indirect (e.g., wired and/or wireless connections between any number of devices or components connecting the operably connected devices) connection. Thus, any path through which information may travel may be considered an operable connection.

Embodiments disclosed herein include providing the capability and flexibility of a database managed by a cluster of nodes for selecting a subset of the nodes to perform data protection operations. Embodiments of the invention include performing, by a data protection system managing assets, discovery on an asset to determine a type of asset (e.g., a database system) such as a single database or a clustered database. Based on the determined type, embodiments of the invention further include obtaining and storing relevant node information of any computing nodes in the database system. Embodiments of the invention further include performing configuration of data protection operations for a clustered database by selecting a subset of the computing nodes in a database system and determining a data protection policy (discussed below) for unavailable computing nodes. The result is a data protection configuration that the data protection system may issue to at least one computing node for performing the data protection operation. A backup agent of the at least one computing node may apply the data protection configuration using the selected subset (also referred to as a selection of computing nodes). This may result in backing up the database of the database system using the selection of computing nodes.

Embodiments of the invention further include functionality for detecting a type of cluster for the database system. For example, the cluster may be an active-passive cluster or an active-active cluster. An active-passive cluster refers to a database system in which two or more computing nodes collectively provide database services for managing the database, where one of the computing nodes is active and the remaining computing nodes are passive. In contrast, an active-active cluster refers to a database system where all (or at least multiple) computing nodes in the database cluster are active. After determining a type of cluster of a database system, embodiments of the invention include functionality for performing protection configurations on each active node in a cluster to configure the active node(s) with a data protection policy that specifies location information for accessing the backup storage system for the purpose of data protection operations like backups. This may be performed after a failover as well, where a new active node is detected in the database system.

Embodiments of the invention further providing centralized data protection operations such as scheduled backups, replication of data in the database, and managing backup copies to apply retention periods and delete expired copies. Embodiments of the invention provide management of these centralized data protection operations in active-passive clusters even in the event of failovers between active nodes in a database system. When a data protection system detects a failover of an active node to a new active node in a database system, a deep discovery may be performed to obtain relevant information from the new active node. However, a scenario may occur in which a data protection operation such as a copy, delete, replication, etc. of data is initiated after a failover occurs and before the deep discovery is performed. In such scenario, embodiments of the invention may utilize the computing capabilities of the previously-active node receiving the request for the data protection operation to resolve the issue and enable the new-active node to perform the data protection operation while limiting interruption to the process.

Various embodiments of the invention are described below.

FIG. 1.1 shows a diagram of a system in accordance with one or more embodiments of the invention. The system (100) includes a database system (130), a data protection system (110), and a backup storage system (130). The system (100) of FIG. 1.1 may include additional, different, and/or different components without departing from the invention.

In one or more embodiments of the invention, the data protection system (110) includes functionality for performing discovery of assets and initiating data protection operations of the assets. The assets may be, for example, a database system (130), standalone database instances (not shown), and/or other data structures that may be backed up using the data protection system (110). To perform the aforementioned functionality, the data protection system (110) includes data movers, database administrators (114), and storage (120) that includes data protection configurations (122) and data protection policies (124). The data protection system (110) may include additional, fewer, and/or different components without departing from the invention.

Figure 6:
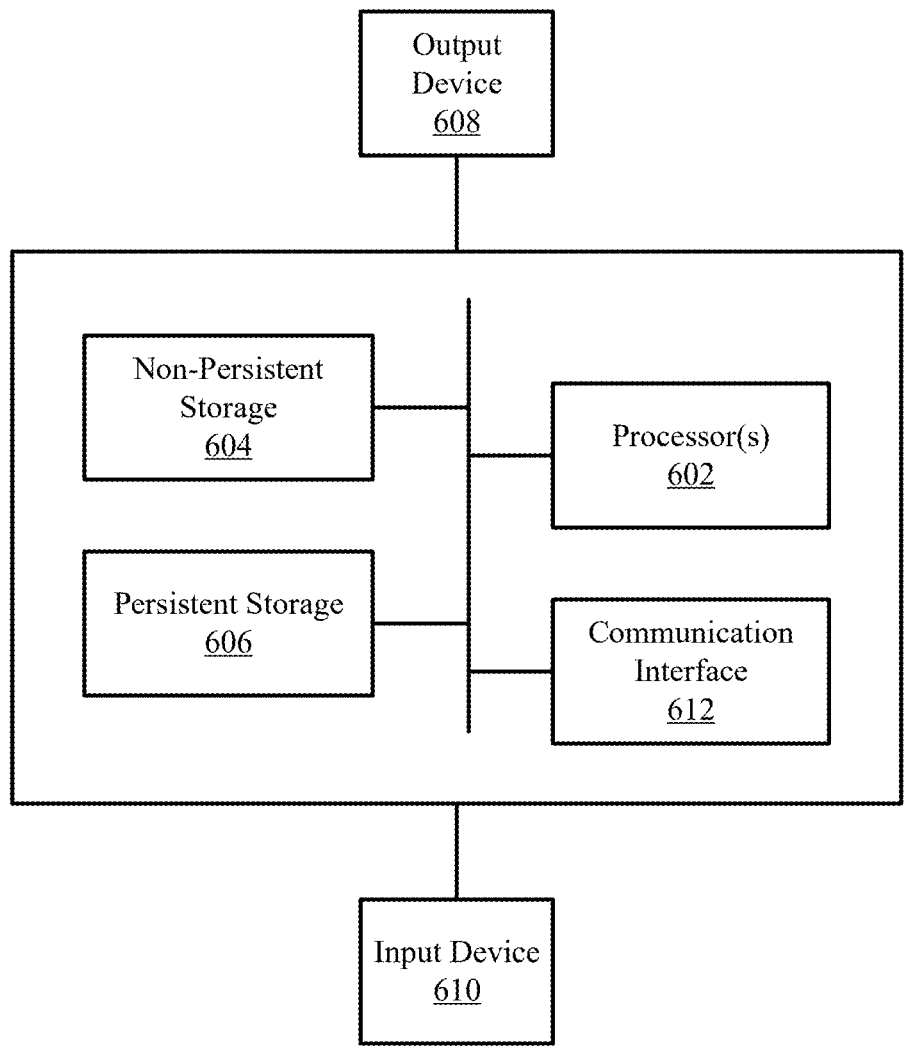
FIG. 6 shows a diagram of a computing device in accordance with one or more embodiments of the invention.

In one or more embodiments disclosed herein, the data protection system (110) is implemented as a computing device (see e.g., FIG. 6). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data protection system (110) described throughout this application.

In one or more embodiments disclosed herein, the data protection system (110) is implemented as a logical device. The logical device may utilize the computing resources of any number of computing devices and thereby provide the functionality of the data protection system (110) described throughout this application.

In one or more embodiments, the data movers (114) include functionality for transmitting data from the database system (130) to the backup storage system (140). Further, the data movers (114) may include functionality for issuing requests for performing data protection operations, configuring computing nodes (132) with data protection policies (124), and/or transmitting any other data without departing from the invention.

In one or more embodiments, the database administrators (114) include functionality for configuring and designing the data protection configurations (122) and data protection policies (124). The database administrators (114) may communicate with the database system (130) to obtain any relevant information such as node information and use the obtained information to configure data protection operations to generate the data protection configurations (122). The data protection policies (124) may specify storage locations for accessing the backup storage system (140), asset information for the database (138) and/or any schedules for backing up the database (138), and/or any other information used for performing data protection operations by the computing nodes (132). The data protection policies (124) may be configured in the computing nodes (132) in accordance with, for example, the method of FIG. 3.1.

In one or more embodiments, the database administrators (114) determine a total number of streams to be provided to the data protection operation. Such number may be determined using factors such as, for example, a size of the database being backed up, a type of backup (metadata backup, full backup, incremental backup, incremental merge backup, etc.), a load balancing operation performed on the computing nodes in a clustered database, and computing capabilities of each computing nodes based on obtained relevant node information. The metadata backup may be a backup of metadata associated with the database, and may require less data storage and transmission relative to a full backup.

In one or more embodiments, an incremental merge operation refers to the concept of accessing a full backup stored in the backup storage system (140) to determine changes made between the full backup and a current state of the database, and storing the changes in the full backup (or separately as an incremental backup). An incremental backup may require less data storage and transmission than a full backup. The incremental merge operation may require the mounting of a full backup to the computing node performing the incremental merge operation. The incremental merge operation further includes allocating channels (e.g., backup streams) to each computing node performing an incremental merge operation of the database.

In one or more embodiments, the database administrators (114) are each implemented as a computing device (see e.g., FIG. 6). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor (s) of the computing device cause the computing device to perform the functionality of the database administrators (118) described throughout this application.

In one or more embodiments disclosed herein, the database administrators (118) are each implemented as a logical device. The logical device may utilize the computing resources of any number of computing devices and thereby provide the functionality of the database administrators (118) described throughout this application.

In one or more embodiments, the database system (130) is a system of components that generate, store, and/or otherwise modify data in a database (138). The database system (130) may include any number of computing nodes (132) that access the database (138) to perform database management operations such as reading, writing, deleting, or otherwise modifying entries in the database (138). Each computing node (134, 136) may include functionality for performing data protection operations to back up the database (138) to the backup storage system (140). At least one of the computing nodes (134, 136) may include functionality for communicating with the data protection system (110) to initiate data protection operations. Such communication may be performed, for example, in accordance with the method of FIGS. 3.1 and 3.2. An example database system (130) is an Oracle™ Real Application Cluster (RAC).

In one or more embodiments, the computing nodes (132) include heterogeneous capabilities. Said another way, each of the computing nodes (132) may provide varying computing capabilities. For example, a first computing node (133, 136) may include higher computing capabilities relative to a second computing node (136) in the database system (130).

In one or more embodiments, the computing nodes (134, 136) may be located in geographically different locations from each other. For example, a first computing node (134) may be located in an east coast of the United States, and a second computing node (136) may be located in the west coast of the United States. The backup storage system (140) may be geographically located in a near region to one or more of the computing nodes (132).

In one or more embodiments disclosed herein, each computing node (134, 136) is implemented as a computing device (see e.g., FIG. 6). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor (s) of the computing device cause the computing device to perform the functionality of the computing node (134, 136) described throughout this application.

In one or more embodiments disclosed herein, each computing node (134, 136) is implemented as a logical device. The logical device may utilize the computing resources of any number of computing devices and thereby provide the functionality of the computing node (134, 136) described throughout this application.

For additional details regarding a computing node (134, 136), see, e.g., FIG. 1.2.

In one or more embodiments, the database system (130) is either an active-active cluster or an active-passive cluster. For additional details regarding an active-passive cluster, see FIG. 1.3. For additional details regarding an active-active cluster, see FIG. 1.4.

While the system (100) is illustrated in FIG. 1.1 as including one database system (130), the data protection system (110) may provide data protection operations for multiple assets such as other database systems. The other database systems may be standalone (e.g., managed by one or zero computing node) or clustered databases (e.g., similar to the database system (130) illustrated in FIG. 1.1). Other assets may be protected by the data protection system (110) without departing from the invention.

In one or more embodiments, the backup storage system (140) stores backups of assets in accordance with data protection operations. The backup storage system (140) may include any number of devices (not shown) that each store one or more backups of, for example, the database (138). Each device in the backup storage system (140) may be associated with a network address (e.g., an internet protocol (IP) address). The information corresponding to backups stored in the backup storage system (140) and any storage location information associated with a backup may be managed by the data protection system (110). Said another way, the data protection system (110) may store the information associated with the backups stored in the backup storage system (140) and the corresponding information for accessing each backup. Such information may be used to configure the computing nodes (132) prior to initiating data protection operations.

In one or more embodiments disclosed herein, the backup storage system (140) is implemented as a logical device. The logical device may utilize the computing resources of any number of computing devices and thereby provide the functionality of the backup storage system (140) described throughout this application.

FIG. 1.2 shows a diagram of an example computing node in accordance with one or more embodiments of the invention. The computing node (150) includes a database agent (152) and a backup agent (154). The computing node (150) may include additional, fewer, and/or different components without departing from the invention.

In one or more embodiments of the invention, the database agent (152) includes functionality for accessing the database (138, FIG. 1.1) discussed above and performing operations such as reading, writing, deleting, and copying data in the database. The operations may be initiated by clients accessing the database on behalf of users of an application. The database agent (152) may include any relevant information (e.g., location information) for accessing the database and any data therein.

In one or more embodiments, the backup agent (154) includes functionality for performing data protection operations for data in the database. The backup agent (154) may utilize computing resources of the computing node (150) to perform the data protection operations. An example data protection operation includes copying data (or metadata such as logs) from the database, allocating a number of backup streams for transmitting the copied data to the backup storage system, and performing the transmission using the allocated number of streams. Another example of a data protection operation includes mounting a backup stored in the backup storage system and performing an incremental merge operation to generate incremental backups (or updating full backups) in the backup storage system and, after the incremental merge operation is complete, unmounting the backup to conserve computing resources of the computing node (150). An example backup agent may be an Oracle Recovery Manager (RMAN).

To perform the data protection operations discussed throughout the present disclosure, the backup agent (154)

may be configured with a data protection configuration (156). The data protection configuration (156) of a computing node (150) may include information used for accessing the backup storage system (e.g., a computing device or a backup of the backup storage system). Such information may be obtained form data protection policies (124, FIG. 1.1) discussed above. For example, the data protection configuration (156) may include IP addresses of the backup storage system Further, the data protection configuration (156) may specify a configuration for a data protection policy.

In one or more embodiments of the invention, the backup agent further includes a system backup to tape (SBT) component that includes functionality for communicating with other computing nodes (134, 136, FIG. 1.1) in the database system (130, FIG. 1.1) to initiate mounting operations, unmounting operations. To perform such operations, the SBT components may send requests that include parameters such as an operation type (mounting or unmounting), a protocol (e.g., a network file system (NFS) or boost file system (BoostFS)), and a mount path that specifies the path for accessing a backup in the backup storage system.

FIG. 1.3 shows a diagram of an example active-passive database system in accordance with one or more embodiments of the invention. The active-passive database system (130A) (also referred to as an active-passive cluster), includes at least one active computing node (172) (also referred to as an active node) and any number of passive computing nodes (174, 176) (also referred to as passive nodes) managing the database (178). The active node (172) may include functionality for performing database management services such as reading from, writing to, or performing data protection operations initiated by the data protection system (110, FIG. 1.1). In contrast, the passive nodes (174, 176) may include functionality to assume the functionality of the active computing node (172) in the event of, for example, a failover where the active computing node (172) is no longer available.

In one or more embodiments, the status of "active" or "passive" in a computing node may be changed within each computing node in a database system (130A). For example, one computing node may be an active node at a first point in time, and at a later point in time, a new computing node may be assigned the active node, making the first computing node a passive node. The status of each computing node in the database system (130A) may be maintained by the data protection system using, for example, a deep discovery.

FIG. 1.4 shows a diagram of an example active-active database system. The active-active database system (130B) may include multiple active computing nodes (184, 186) performing the functionality of an active node discussed throughout the present disclosure to manage the database (188). The status of each active computing node (184, 186) may be maintained by the data protection system (110, FIG. 1.1). For example, an active node may become unavailable, and such status change may be detected using a deep discovery performed on the database system (130B).

FIG. 2 shows a flowchart of a method for performing a discovery of a database system in accordance with one or more embodiments of the invention. The method shown in FIG. 2 may be performed by, for example, a data protection system (110, FIG. 1.1). Other components of the system illustrated in FIG. 1.1 may perform the method of FIG. 2 without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

Turning to the method, in step 200, a discovery request is obtained for a database system. In one or more embodiments, the discovery request specifies performing a discovery of the database system to identify components of the database system (e.g., computing nodes, if any), a type of cluster, if applicable, and to obtain node information from the components of the database system.

In step 202, after the database system is determined to be a clustered database, a determination is made about whether the type of cluster of the database system is an active-passive cluster or an active-active cluster. The determination may be performed by communicating with at least one active node in the database system that provides the information specifying the type of cluster. If the database system is an active-passive cluster, the method proceeds to step 204; otherwise, the method proceeds to step 206.

In step 204, a status is obtained for each computing node in the database system. The status may specify, for example, whether a computing node is active, passive, unavailable, unconfigured, or any other information without departing from the invention.

In step 206, node information is further obtained about each computing node in the database system. In one or more embodiments, the node information includes hostnames of each computing node, network addresses (e.g., IP address) of each computing node, database identifiers of the database in the database system, a fully qualified domain name (FQDN), and any other information associated with the computing nodes and/or the database in the database system. An FQDN refers to a node identifier used by a protocol within the database system to identify each computing node. The node information may be obtained from, for example, one active node communicating with the data protection system.

In one or more embodiments, the computing node providing the requested node information may include functionality for communicating with the other computing nodes in the database system to obtain the node information from the other computing nodes sent to the data protection system.

In step 208, a determination is made about whether a deep discovery is requested or whether changes to the database system are detected. Such determination may be made based on the discovery request. Said another way, the discovery request may specify performing the deep discovery. Further, the deep discovery may be determined based on a schedule for deep discovery performed periodically (e.g., every fifteen minutes). Alternatively, the deep discovery may be performed based on any changes made to the database system as obtained from the node information. Changes may include, for example, addition of a computing node (e.g., via detection of an unrecognized hostname for a computing node in the obtained node information), removal of a computing node, notice of unavailability of a computing node, failure to access the database by the computing nodes, failover and modification of active status of a computing node (more details in FIG. 3.2) and/or any other changes without departing from the invention. If either a deep discovery is requested or the changes to the database system are detected, the method proceeds to step 210; otherwise, the method ends following step 208.

In step 208, discovered changes are obtained and a deep discovery is performed to obtain deep discovery information. The deep discovery information may include, for example, identifying the added or removed computing nodes, determining whether a computing node has been configured for a data protection operation, and any changes to the database that may impact future configurations of the data protection operations.

FIG. 3.1 shows a flowchart of a method for configuring a data protection policy on a set of computing nodes in accordance with one or more embodiments of the invention. The method shown in FIG. 3.1 may be performed by, for example, a data protection system (110, FIG. 1.1). Other components of the system illustrated in FIG. 1.1 may perform the method of FIG. 3.1 without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 300, a policy request is obtained for configuring a data protection policy for the clustered database.

In step 302, an unprocessed computing node in the database system is selected to process in accordance with steps 304-308. This computing node may be referred to as the present computing node. The present computing node may be a new computing node in each iteration of steps 302-308 for all computing nodes in the database system.

In step 304, a determination is made about whether an asset discovery (also referred to as a deep discovery) has performed on the present computing node. The determination is made based on whether the present computing node was included in a previous deep discovery (e.g., one discussed in FIG. 2), or whether the present computing node was once active or currently active. If the present computing node has undergone asset discovery, the method proceeds to step 306; otherwise, the method proceeds to step 308.

In step 306, a selection of computing nodes is updated to include the present computing node. The selection may be a list of computing nodes assigned to undergo the configuration.

In step 308, a determination is made about whether all computing nodes in the database system have been processed via steps 302-308. If all computing nodes have been processed, the method proceeds to step 310; otherwise, the method returns to step 302.

In step 310, a protection configuration is performed on all computing nodes included in the selection of computing nodes (discussed in step 306). The protection configuration includes updating a data protection policy stored in the selected computing nodes to include the information used for performing data protection operations. The information may include storage location information for accessing the backups in the backup storage system, accessing the backup storage system itself, or asset information for resolving any issues that arise with performing a data protection operation.

FIG. 3.2 shows a flowchart of a method for managing a failover in accordance with one or more embodiments of the invention. The method shown in FIG. 3.2 may be performed by, for example, a data protection system (110, FIG. 1.1). Other components of the system illustrated in FIG. 1.1 may perform the method of FIG. 3.2 without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 320, a notification of failover in the database system is detected. In one or more embodiments, the failover includes a status change of an active node in an active-passive database system, where a previously-active node is no longer available to reasonably perform the functionality of an active node, and a previously-passive node becomes the new active node. Notification of the failover is issued to the data protection system by the new active node.

In step 322, deep discovery is performed to obtain updated node status of each computing node in the database system. Any node information not previously obtained in a deep discovery (e.g., FIG. 2) may be obtained in step 302 for any other changes in the database system (e.g., new nodes, removed nodes, etc.).

In step 324, protection configuration is performed on the active computing node(s). As discussed above in step 308, the protection configuration includes updating a data protection policy stored in the new active nodes to include the information used for performing data protection operations.

Figure 4:
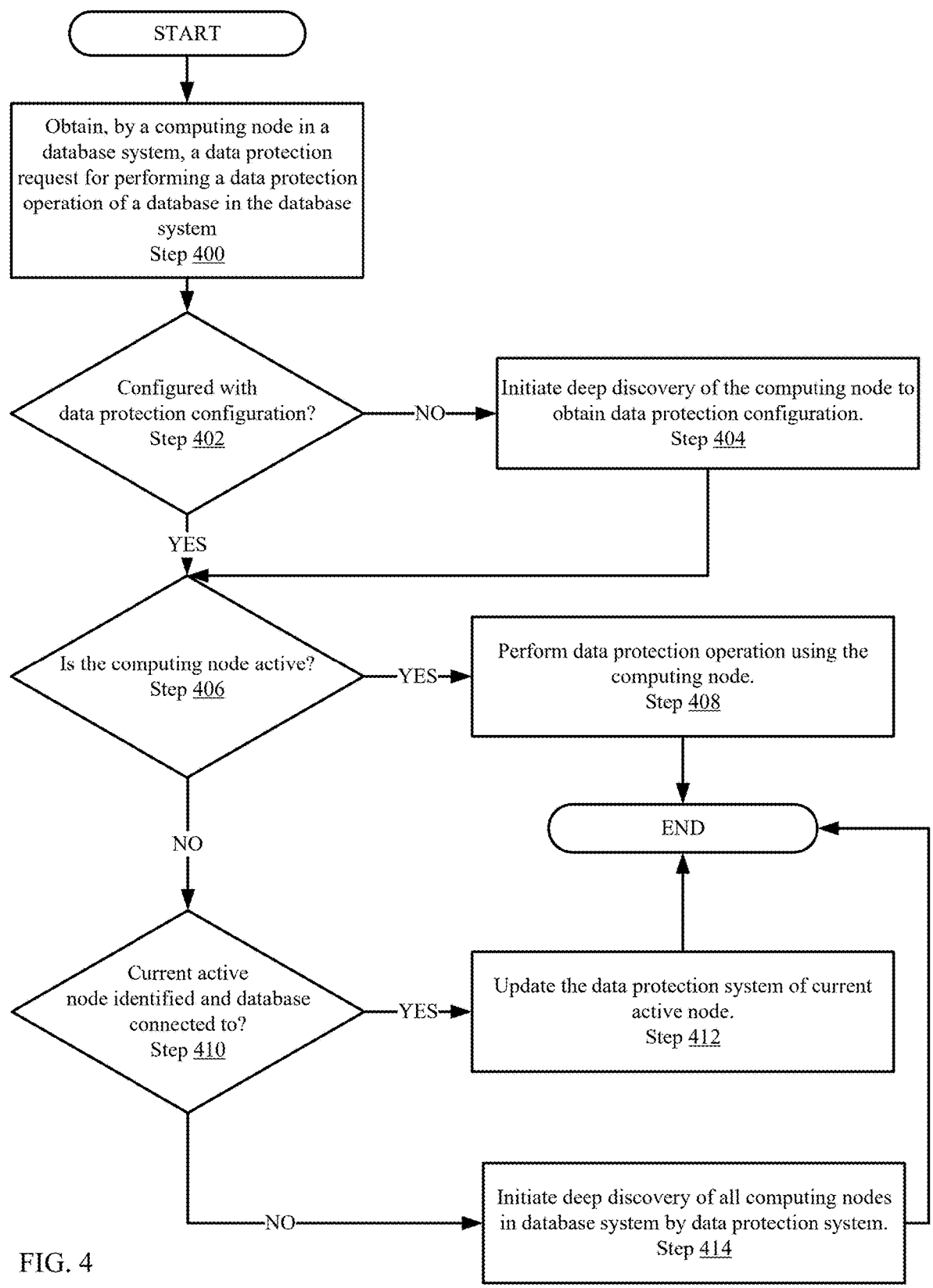
FIG. 4 shows a flowchart of a method for performing a data protection operation in accordance with one or more embodiments of the invention.

FIG. 4 shows a flowchart of a method for performing a data protection operation in accordance with one or more embodiments of the invention. The method shown in FIG. 4 may be performed by, for example, a computing node (150, FIG. 1.2). Other components of the system illustrated in FIGS. 1.1-1.4 may perform the method of FIG. 4 without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 400, a data protection request is obtained of performing a data protection operation of a database in the database system. As discussed above, the data protection operation may be a backup of the database, a replication of the database operation, a deletion of a backup, an incremental merge operation, and/or any other operations without departing from the invention. In one or more embodiments, the data protection system assumes (e.g., based on a previous deep discovery performed) that the computing node obtaining the data protection request is active.

In step 402, a determination is made about whether the computing node performing the method of FIG. 4 is configured with a data protection configuration to include a data protection policy as discussed in step 308. If the computing node is configured, the method proceeds to step 406; otherwise, the method proceeds to step 404.

In step 404, a deep discovery of the computing node to be protected is performed to obtain data protection configuration. As discussed above in step 308, the protection configuration includes updating a data protection policy stored in the new active nodes to include the information used for performing data protection operations.

In step 406, a determination is made about whether the computing node is active. If the computing node is active, the method proceeds to step 408; otherwise, the method proceeds to step 410.

In step 408, following the determination that the computing node is active, the data protection operation is performed by the computing node as requested.

In step 410, following the determination that the computing node is not active, a determination is made about whether the active node is identified and the database is connected. The determination of step 410 may be based on whether the computing node is aware of the current active node and whether the computing node establishes a successful connection to the database. If the current active node is identified and the database is successfully connected to, the method proceeds to step 412; otherwise, the method proceeds to step 414.

In step 412, following the determination that the current active node is identified and the database is successfully accessible, the computing node notifies the data protection system of the current active node.

In step 414, following the determination that either the current active computing node is not identified or the database is not successfully accessed, the computing node initiates the deep discovery of the database by notifying the data protection system of the change in status of the computing node to no longer be active. The data protection system may, in response, perform the deep discovery. Alternatively, if the database is not accessible by the computing node, the computing node may notify the data protection system of the unsuccessful connection, and this may trigger the data protection system to perform the deep discovery to update the current state of the database system.

Example

To clarify aspects of the invention, the following describes an example in accordance with one or more embodiments of the invention. The example, described using FIGS. 5.1-5.2, is not intended to limit aspects of the invention. In the example, consider a scenario in which hardware components have been purchased by a client and from a vendor. Actions performed by components of FIGS. 4.1-4.2 may be represented using circled numbers and described below using brackets (e.g., "[1]").

Turning to the example and to FIG. 5.1, a data protection system (510) includes functionality for discovering computing nodes in a clustered database (530). The clustered database (530) includes computing nodes A (531), B (532), D (534), E (535), and F (536) and a database (538). Based on the discovery, the data protection system (510) obtains relevant node information from each computing node (531, 532, 534, 535, 536), including that computing node A (531) is active, and the remaining computing nodes (532, 533, 534, 535, 536) are passive.

At a later point in time, computing node A (531) undergoes a failover where the active status is transferred to computing node B (532). Further, computing node C (533) is installed on the clustered database (530) as a new passive node. The failover and the installation of the new computing node C (533) may be performed after the discovery performed by the data protection system (510) and prior to a next scheduled deep discovery. Also prior to the next scheduled deep discovery, the data protection system (510) issues a data protection request specifying backing up the database (538) to a backup storage system (550) [1].

In response to receiving the data protection request, a backup agent (540) of computing node A (531) performs the method of FIG. 4 to identify computing node B (532) as the currently active node, and confirms successful connection to the database (538) [2]. Computing node A (531) updates the data protection system (510) with the new information [3].

Turning to FIG. 5.2, the data protection system (510) responds to obtaining the changes to the clustered database (530) by initiating a deep discovery. The deep discovery includes confirming the new status of computing node B (532) and the installation of computing node C (533). The data protection system (510) performs the method of FIG. 3.1 to perform the protection configuration on computing node C (533) and computing node B (532) to ensure that computing nodes B (532) and C (533) are properly configured to perform backup operations [4]. Following the configuration and deep discovery, the data protection system (510) sends the data protection request (previously sent to computing node A (531)) to computing node B (532). The request is sent to a backup agent B (541) of computing node B (532) [5].

After receiving the request, computing node A (431) performs the method of FIG. 4 to confirm its active status, confirm its protection configuration, and perform the backup of the database (538) to store the backup in the backup storage system (550).

End of Example

As discussed above, embodiments of the invention may be implemented using computing devices. FIG. 6 shows a diagram of a computing device in accordance with one or more embodiments of the invention. The computing device (400) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computer (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same as or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention provide methods for backing up large database clusters by communicating with one node to initiate the data protection operation (e.g., a backup). Embodiments of the invention leverage load balancing capabilities of computing nodes in database systems by allocating multiple backup streams to each computing node in a selected subset of the database system, configuring the data protection operation on the data protection system (external to the database system) and initiating the database operation on at least one computing node. The at least one computing node may include the functionality for servicing a configured data protection configuration by distributing the streams among the selected computing nodes and distributing streams among the selected computing nodes in accordance with a data protection policy.

By assigning the responsibility of distribution of backup streams to the computing nodes rather than the data protection system, this intelligent and unique approach increases the reliability and efficiency of the system. Additionally, it has built-in capability to confirm whether each selected computing node is available in the cluster during backup, ensuring efficient allocation of backup streams and graceful handling of any node unavailability during the backup operation, resulting in a high success rate for backups.

Further, database systems may implement active-passive clusters in which the active node in a database system may alter in the event of a failover. Embodiments of the invention enable the data protection system to be aware of the changes in status (e.g., active or passive) of all computing nodes in a database cluster, and performing deep discovery only in response to detected changes to the database systems. As such, resources used for the deep discovery are optimized in the database system and in the data protection system.

Thus, embodiments of the invention may address the problem of inefficient use of computing resources. This problem arises due to the technological nature of the environment in which file systems are utilized, maintaining system efficiency when initiating and performing data protection operations.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing a database system, the method comprising:
  obtaining, by a data protection system, a policy request for configuring a data protection policy on the database system, wherein the database system comprises at least one active computing node;
  in response to obtaining the policy request:
    making a first determination that a first computing node of the database system has been discovered via a deep discovery;
    based on the first determination, updating a selection of computing nodes with the first computing node;
    making a second determination that a second computing node of the database system has not been discovered via the deep discovery, wherein the second determination is based on whether the second computing node has been active at least once;
    based on the second determination, not including the second computing node in the selection; and
    after the second determination, performing a protection configuration on the selection of computing nodes,
    wherein the protection configuration comprises issuing a configuration request for installing the data protection policy to each computing node in the selection of computing nodes,
    wherein the data protection policy comprises asset information and storage location information used for backing up a database of the database system.

2. The method of claim 1, further comprising:
  prior to obtaining the policy request:
    obtaining, by the data protection system, a discovery request for performing the deep discovery on the database system;
  in response to the discovery request:
    determining that the database system is a database cluster comprising the database and a plurality of computing nodes; and
    obtaining, from the first computing node, node information comprising a hostname, a network address, and a fully qualified domain name (FQDN),
  wherein the second computing node is installed in the database system after obtaining the node information.

3. The method of claim 2, further comprising:
  after obtaining the node information from the first computing node, obtaining a second discovery request; and
  in response to the second discovery request:
    obtaining, from the second computing node, second node information comprising a second hostname, a second network address, and a second FQDN.

4. The method of claim 2, wherein the database cluster is an active-passive database, and wherein the first computing node is an active node and the second computing node is a passive node.

5. The method of claim 2, wherein the database cluster is an active-active database, and wherein the first and second computing nodes are active nodes.

6. The method of claim 1, wherein the deep discovery comprises obtaining, by the data protection system, node information about each computing node in the database system.

7. The method of claim 1, further comprising:
  obtaining notification of a failover in the database system, wherein the notification indicates that the second computing node has become an active node;
  based on the notification, performing the deep discovery on the database system to identify a status of each computing node in the database system;
  identifying the second computing node as the active node; and
  based on the identifying, performing the protection configuration on the second computing node.

8. A non-transitory computer readable medium comprising computer readable program code, which when executed by a computer processor enables the computer processor to perform a method for managing data protection operations in a database system, the method comprising:
  obtaining, by a data protection system, a policy request for configuring a data protection policy on the database system, wherein the database system comprises at least one active computing node; and
  in response to obtaining the policy request:
    making a first determination that a first computing node of the database system has been discovered via a deep discovery;
    based on the first determination, updating a selection of computing nodes with the first computing node;
    making a second determination that a second computing node of the database system has not been discovered via the deep discovery, wherein the second determination is based on whether the second computing node has been active at least once;

based on the second determination, not including the second computing node in the selection; and after the second determination, performing a protection configuration on the selection of computing nodes, wherein the protection configuration comprises issuing a configuration request for installing the data protection policy to each computing node in the selection of computing nodes, wherein the data protection policy comprises asset information and storage location information.

9. The non-transitory computer readable medium of claim 8, the method further comprising:

prior to obtaining the policy request:

obtaining, by the data protection system, a discovery request for discovering the database system;

in response to the discovery request:

determining that the database system is a database cluster comprising the database and a plurality of computing nodes; and obtaining, from the first computing node, node information comprising a hostname, a network address, and a fully qualified domain name (FQDN), wherein the second computing node is installed in the database system after obtaining the node information.

10. The non-transitory computer readable medium of claim 9, the method further comprising:

after obtaining the node information from the first computing node, obtaining a second discovery request; and in response to the second discovery request:

obtaining, from the second computing node, second node information comprising a second hostname, a second network address, and a second FQDN.

11. The non-transitory computer readable medium of claim 9, wherein the database cluster is an active-passive database, and wherein the first computing node is an active node and the second computing node is a passive node.

12. The non-transitory computer readable medium of claim 9, wherein the database cluster is an active-active database, and wherein the first and second computing nodes are active nodes.

13. The non-transitory computer readable medium of claim 8, wherein the deep discovery comprises obtaining, by the data protection system, node information about each computing node in the database system.

14. The non-transitory computer readable medium of claim 8, the method further comprising:

obtaining notification of a failover in the database system, wherein the notification indicates that the second computing node has become an active node;

based on the notification, performing the deep discovery on the database system to identify a status of each computing node in the database system;

identifying the second computing node as the active node; and based on the identifying, performing the protection configuration on the second computing node.

15. A system, comprising:

a database system comprising a plurality of computing nodes;

a data protection system, wherein the data protection system comprises a processor; and memory comprising instructions, which when executed by the processor, cause the processor to perform a method, the method comprising:

obtaining a policy request for configuring a data protection policy on the database system, wherein the database system comprises at least one active computing node;

in response to obtaining the policy request:

making a first determination that a first computing node of the database system has been discovered via a deep discovery;

based on the first determination, updating a selection of computing nodes with the first computing node;

making a second determination that a second computing node of the database system has not been discovered via the deep discovery, wherein the second determination is based on whether the second computing node has been active at least once;

based on the second determination, not including the second computing node in the selection; and after the second determination, performing a protection configuration on the selection of computing nodes, wherein the protection configuration comprises issuing a configuration request for installing the data protection policy to each computing node in the selection of computing nodes, wherein the data protection policy comprises asset information and storage location information for backing up a database of the database system.

16. The system of claim 15, the method further comprising:

prior to obtaining the policy request:

obtaining, by the data protection system, a discovery request for discovering the database system;

in response to the discovery request:

determining that the database system is a database cluster comprising the database and a plurality of computing nodes; and obtaining, from the first computing node, node information comprising a hostname, a network address, and a fully qualified domain name (FQDN), wherein the second computing node is installed in the database system after obtaining the node information.

17. The system of claim 16, the method further comprising:

after obtaining the node information from the first computing node, obtaining a second discovery request; and in response to the second discovery request:

obtaining, from the second computing node, second node information comprising a second hostname, a second network address, and a second FQDN.

18. The system of claim 16, wherein the database cluster is an active-passive database, and wherein the first computing node is an active node and the second computing node is a passive node.

19. The system of claim 16, wherein the database cluster is an active-active database, and wherein the first and second computing nodes are active nodes.

20. The system of claim 15, the method further comprising:

obtaining notification of a failover in the database system, wherein the notification indicates that the second computing node has become an active node;

based on the notification, performing the deep discovery on the database system to identify a status of each computing node in the database system;
identifying the second computing node as the active node; and
based on the identifying, performing the protection configuration on the second computing node.

* * * * *